C. F. HANDSHY AND W. P. POTTER.
SHIPPING TICKET.
APPLICATION FILED OCT. 14, 1918.

1,338,770.

Patented May 4, 1920.
2 SHEETS—SHEET 1.

UNITED STATES PATENT OFFICE.

CHARLES F. HANDSHY AND WALTER P. POTTER, OF SPRINGFIELD, ILLINOIS.

SHIPPING-TICKET.

1,338,770.                 Specification of Letters Patent.      Patented May 4, 1920.

Application filed October 14, 1918. Serial No. 257,953.

*To all whom it may concern:*

Be it known that we, CHARLES F. HANDSHY and WALTER P. POTTER, both citizens of the United States, residing at Springfield, in the county of Sangamon and State of Illinois, have jointly invented certain new and useful Improvements in Shipping-Tickets, of which the following is a description.

Our invention belongs to that general class of tickets used for checking and accounting purposes, in which indications are recorded on two parts at one operation, one part of the ticket being retained by one party, while another part is retained by another party for the purpose of aiding them in keeping a record of shipments made, moneys paid, or in adjusting accounts with one another.

Our invention is particularly designed for use in relation to freight shipments, and has for its object a simple, effective and very accurate means for the purpose stated. To this end it consists in the novel ticket shown and described, and more particularly set forth in the claim.

In the drawings, wherein like reference characters indicate like or corresponding parts, Figure 1 is a face view of our improved ticket, as particularly adapted for use in the dairy business;

Fig. 2 shows the two sections of the ticket folded one upon the other along the medial line preparatory to punching or cutting the same for recording purposes when a punch is used;

Fig. 3 is a section taken substantially on line 3—3 of Fig. 2;

Fig. 4 shows a portion of the ticket as it is separated into sections, indicating the recording thereon, as above set forth;

Figure 5:
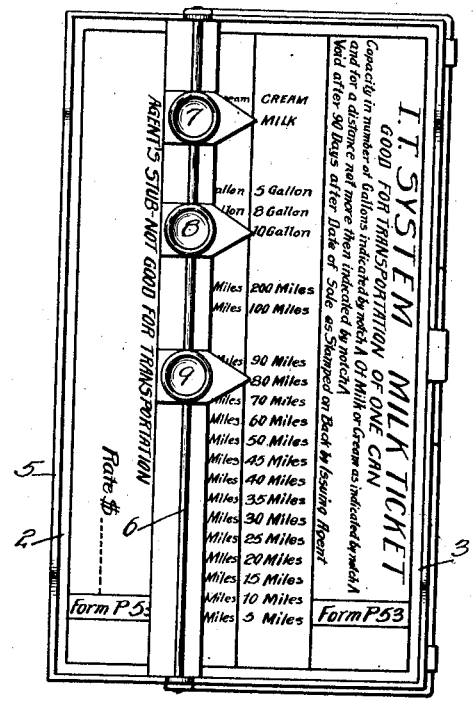
Fig. 5 is a plan view of the ticket as contained in a box cutter, such as is now in use.

In the drawings, 1 indicates a ticket which is divided into sections 2—3, if desired adapted to be folded together one upon the other along a medial line 4.

The two sections of the ticket may have upon them the necessary information as to the transportation line or shipping agent, rates, or any other useful data or information in relation to the transaction. On each side of the medial line are arranged, as shown, three groups relating to the different parts of the record of the particular transaction in hand, the groupings being in alinement on the two sections. In the particular embodiment shown in the drawings, it will be noted that near the top of the ticket are the words "Cream" and "Milk". These words in each instance are printed on the same horizontal line, so that as the ticket is cut or punched on a horizontal line by a suitable device, the product will be indicated on both sections of the ticket at substantially the same point and indicate the same word. Below this group indicating the product, is another group indicating the bulk contents. As applied in the particular embodiment shown, we have found that three lines are sufficient to indicate the quantities, thus as indicated, the words five gallons, eight gallons, ten gallons, arranged in alinement with one another as before described.

Below this is a further group indicating the distance the product is to be shipped. This is arranged in convenient multiples so that the person in charge may readily indicate the distance the goods are to be sent.

In the dairy business it is contemplated that there shall be such a ticket with each can of milk or cream, the shipper delivering the cans and receiving from the agent a series of sections each indicating a can, the product thereof, the bulk contents and the distance the same is to be shipped. The shipping agent retains the mating section. The shipper's section may serve as a receipt for the goods delivered to the transportation company or shipping agent, or it may indicate transportation charges paid and be attached to the shipment and be taken up by the transportation company's agent handling in route or at destination, the shipping agent holding his section as a convenient means of keeping accounts, etc. At stated periods the accounts may be cast up based upon these tickets, the interested parties being able to accurately verify their accounts by the means indicated.

As illustrated on the ticket shown in Fig. 4, it indicates that the can shipped contained milk, that there were ten gallons of the same, and that it is to be shipped eighty miles.

Figure 6:
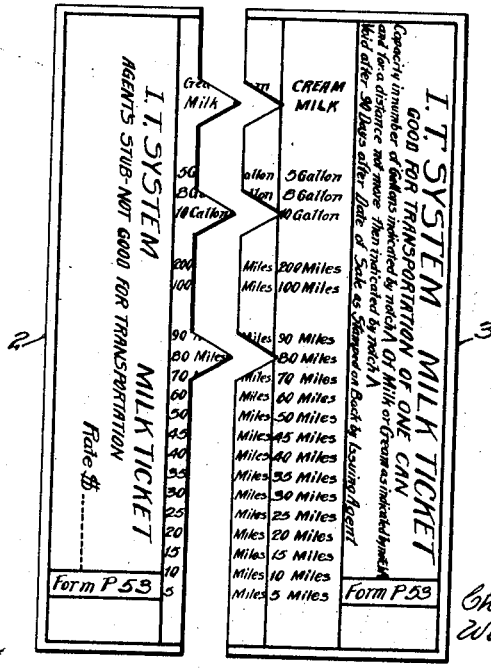
Fig. 6 shows the two sections of the ticket as there used.

One of the most convenient and possibly the most practicable methods of employing the ticket is shown in Figs. 5 and 6. As here shown the tickets are placed in a box or container 5 provided with a longitudinal rod 6. A series of cutting members 7, 8, 9 are slidingly mounted on the rod so as to be adjusted at any desired point in relation to the ticket. The part 3 may then be readily detached from the part 2, indicating on both sections and in transverse alinement on the ticket the particular points where the cutters were located. As shown in Fig. 6, each section indicated as before, that the product was milk, the quantity was ten gallons, and the distance was eighty miles.

Obviously, the ticket may be modified for other articles, and the severance and record on the two sections made in other ways without departing from the spirit of our invention; hence we do not wish to be understood as limiting ourselves to the particular use or to the particular arrangement, or to the particular manner of cutting the record indicated.

Having thus described our invention, what we claim as new and desire to secure by Letters Patent is:—

A traffic ticket having thereon appropriate information identifying the shipper and data relating to the transaction, said ticket comprising two parallel sections, said sections along their adjoining marginal portions each having arranged in a column thereon characters indicating the product shipped, the bulk quantity of contents and the distance the same is to be transported, the columns of characters on both sections being the same, with corresponding characters of the columns located opposite each other, whereby upon notching the ticket at the adjoining marginal portions of the sections in alinement with said characters, and separating the sections, there will be duplicate sections with the same information characters indicated thereon, in relation to the product, contents and distance, substantially as described.

In testimony whereof, we have hereunto signed our names in the presence of two subscribing witnesses.

CHARLES F. HANDSHY.
WALTER P. POTTER.

Witnesses:
A. L. FREDERICK,
W. C. LAY.